US009199197B2

(12) United States Patent
Yoshida et al.

(10) Patent No.: US 9,199,197 B2
(45) Date of Patent: Dec. 1, 2015

(54) EXHAUST GAS PURIFICATION APPARATUS FOR INTERNAL COMBUSTION ENGINE

(75) Inventors: Kohei Yoshida, Gotenba (JP); Yasuaki Nakano, Sunto-gun (JP); Tadashi Watanabe, Toyota (JP); Kotaro Hayashi, Mishima (JP); Takamitsu Asanuma, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2217 days.

(21) Appl. No.: 12/087,509

(22) PCT Filed: Sep. 6, 2007

(86) PCT No.: PCT/IB2007/002571
§ 371 (c)(1),
(2), (4) Date: Jul. 9, 2008

(87) PCT Pub. No.: WO2008/029263
PCT Pub. Date: Mar. 13, 2008

(65) Prior Publication Data
US 2009/0000277 A1    Jan. 1, 2009

(30) Foreign Application Priority Data

Sep. 6, 2006   (JP) .................................. 2006-241365

(51) Int. Cl.
*F01N 3/28* (2006.01)
*B01D 53/94* (2006.01)
(Continued)

(52) U.S. Cl.
CPC .......... *B01D 53/9422* (2013.01); *F01N 3/0807* (2013.01); *F01N 3/0814* (2013.01); *F01N 3/0821* (2013.01); *F01N 13/009* (2014.06); *F01N 13/0093* (2014.06);
(Continued)

(58) Field of Classification Search
USPC ............ 60/274, 286, 295, 297, 301, 303, 311
See application file for complete search history.

(56) References Cited

U.S. PATENT DOCUMENTS 7,093,428 B2 *  8/2006  LaBarge et al. ................. 60/286
2003/0125202 A1  7/2003  Ruwisch et al.
2004/0219077 A1 * 11/2004  Voss et al. ..................... 422/177
(Continued)

FOREIGN PATENT DOCUMENTS

DE    100 23 049 A1    11/2001
DE    101 48 915 A1    3/2003
(Continued)

*Primary Examiner* — Thomas Denion
*Assistant Examiner* — Jorge Leon, Jr.
(74) *Attorney, Agent, or Firm* — Oliff PLC (57) ABSTRACT

A fuel addition valve that adds fuel into the exhaust gas passage of the engine in the form of fine fuel droplets, an upstream NOx adsorption-reduction catalyst, and a downstream NOx adsorption-reduction catalyst are arranged in this order. Platinum Pt and palladium Pd, as noble metal, are supported on the downstream NOx adsorption-reduction NOx catalyst such that the ratio of the mole number of the platinum Pt to the sum of the mole numbers of the platinum Pt and the palladium Pd is approx. 50% to approx. 80%. Only platinum Pt is supported on the upstream NOx adsorption-reduction catalyst. According to this structure, even when liquid fuel is supplied into exhaust gas, NOx can be effectively released from the NOx adsorption-reduction catalyst, and further the amount of NOx that the NOx adsorption-reduction catalyst can adsorb at a low temperature increases.

5 Claims, 11 Drawing Sheets

(51) Int. Cl.
  *F01N 3/08* (2006.01)
  *F01N 13/00* (2010.01)
(52) U.S. Cl.
  CPC .... *B01D 53/9477* (2013.01); *B01D 2255/1021* (2013.01); *B01D 2255/1023* (2013.01); *Y02C 20/10* (2013.01)

(56) References Cited

U.S. PATENT DOCUMENTS

2005/0020443 A1* 1/2005 Wei et al. .................. 502/325
2006/0107653 A1* 5/2006 Nakatani .................... 60/286
2006/0179821 A1* 8/2006 Zhan et al. .................. 60/286
2006/0179822 A1* 8/2006 Dalla Betta ................. 60/288
2006/0188416 A1* 8/2006 Alward et al. ............... 422/180
2007/0277513 A1* 12/2007 Yoshida et al. .............. 60/299

FOREIGN PATENT DOCUMENTS

| EP | 1 316 354 A1 | 6/2003 |
| JP | A 10-249169 | 9/1998 |
| JP | B2 3391878 | 1/2003 |
| JP | A 2003-205245 | 7/2003 |
| WO | WO 02/02916 A1 | 1/2002 |
| WO | WO 2007/023712 A1 | 3/2007 |

* cited by examiner

EXHAUST GAS PURIFICATION APPARATUS FOR INTERNAL COMBUSTION ENGINE

INCORPORATED BY REFERENCE

The disclosure of Japanese Patent Application No. 2006-241365 filed on Sep. 6, 2006, including the specification, drawings and abstract is incorporated herein by reference in its entireity.

BACKGROUND OF THE INVENTION

1. Field of the Invention

The invention relates to an exhaust gas purification apparatus for an internal combustion engine.

2. Description of the Related Art

An internal combustion engine is known in which a NOx adsorption-reduction catalyst that adsorbs NOx contained in the incoming exhaust gas when the air-fuel ratio of the exhaust gas is lean and releases the adsorbed NOx when the air-fuel ratio of the exhaust gas is equal to the stoichiometric air-fuel ratio or rich is provided in an exhaust gas passage. The NOx adsorption-reduction catalyst includes a noble metal catalyst made of platinum Pt and a NOx absorbent. When the air-fuel ratio of the exhaust gas is lean, the NOx contained in the exhaust gas, that is, the NO contained in the exhaust gas is oxidized into $NO_2$ on the platinum Pt and then absorbed in the NOx absorbent in the form of nitrate ions $NO_3^-$.

On the other hand, when releasing the absorbed NOx from the NOx absorbent and reducing the released NOx, the air-fuel ratio of the exhaust gas entering the NOx adsorption-reduction catalyst is made rich. As the air-fuel ratio of the exhaust gas is made rich, the oxygen concentration of the exhaust gas decreases, so that the NOx absorbed in the NOx absorbent in the form of nitrate ions $NO_3^-$ becomes $NO_2$ and moves to the surface of the platinum Pt, and the $NO_2$ is then reduced by the unburned HC and CO contained in the exhaust gas.

The air-fuel ratio of exhaust gas can be made rich by supplying additional fuel into the respective combustion chambers or by adding fuel into the exhaust gas passage. In either case, if fuel is added such that the added fuel enters the NOx adsorption-reduction catalyst in the form of a fuel gas, NOx is immediately released from the NOx adsorption-reduction catalyst and then reduced in response to the air-fuel ratio of the exhaust gas being made rich. However, this does not happen if fuel is added into the exhaust gas passage in the form of fine fuel droplets and then adheres to the NOx adsorption-reduction catalyst in the form of fuel duplets.

That is, if the fuel that has been added to make the air-fuel ratio of the exhaust gas rich adheres to the NOx adsorption-reduction catalyst in the form of fuel droplets, the platinum Pt supported on the NOx adsorption-reduction catalyst is covered by the liquid fuel. When the platinum Pt is covered by the liquid fuel, the oxygen contained in the exhaust gas cannot reach the surface of the platinum Pt. Therefore, the liquid fuel on the platinum Pt cannot be oxidized properly. If the liquid fuel cannot be oxidized properly, the oxygen in the exhaust gas is not sufficiently consumed. Thus, the oxygen concentration does not decrease sufficiently, and therefore NOx is not released from the NOx absorbent sufficiently. Further, in this case, because the liquid fuel is not effectively vaporized, the amount of unburned HC in the exhaust gas becomes insufficient, and therefore the released NOx can not be reduced sufficiently.

In view of this, the present inventors, during their study, have focused on the oxygen adsorption capability of palladium Pd and discovered the following. That is, if palladium Pd is supported on the NOx adsorption-reduction catalyst as noble metal as well as platinum Pt, the oxidization of the liquid fuel on the NOx adsorption-reduction catalyst is promoted by a large amount of oxygen adsorbed in the palladium Pd, and the heat generated by this oxidization accelerates the vaporization of the liquid fuel on the platinum Pt, thus promoting the release of NOx from the NOx absorbent.

If the amount of palladium Pd is increased and the amount of platinum Pt is reduced, the vaporization of the liquid fuel on the platinum Pt is promoted by the reaction heat generated through the oxidization of the palladium Pd. In this case, however, because the amount of platinum Pt is small, the NOx release effect is weak, and therefore NOx cannot be released effectively. On the other hand, if the amount of palladium Pd is reduced and the amount of platinum Pt is increased, the oxidization of the liquid fuel on the platinum Pt is not promoted by the reaction heat generated through the oxidization of the oxygen adsorbed in the palladium Pd, and therefore the NOx release effect becomes weak despite the increased platinum Pt. Thus, in this case, too, NOx cannot be released effectively.

As such, it is clear that the effective release of NOx can be achieved only when the ratio between the amount of platinum Pt and the amount of palladium Pd is in a given proper range that is not excessively high nor excessively low. With regard to this point, Japanese Patent Application Publication No. 2003-205245 (JP-A-2003-205245) describes a particulate filter on which platinum Pt and palladium Pd are supported such that 1 gram of platinum and 1 gram of palladium Pd are supported per liter of the volume of the filter body. In this case, the ratio of the mole number of the platinum Pt to the sum of the mole numbers of the platinum Pt and the palladium Pd is approx. 35.7. However, with such a mole ratio, the amount of the palladium Pd is too large as compared to the amount of the platinum Pt. Therefore, NOx cannot be released effectively.

Meanwhile, the present inventors discovered the following as a result of their continuous study on the effect of palladium Pd. That is, if the ratio between the amount of platinum Pt and the amount of palladium Pd is set appropriately, the effective release of NOx can be accomplished. However, when the temperature of the NOx adsorption-reduction catalyst is low, the palladium Pd impedes the absorption of $NO_2$ in the exhaust gas into the NOx absorbent. Thus, when the temperature of the NOx adsorption-reduction catalyst is low, such as immediately after engine start, the NOx removal rate decreases.

SUMMARY OF THE INVENTION

In view of the above, the invention provides an exhaust gas purification apparatus which ensures NOx is effectively released from a NOx adsorption-reduction catalyst even when fuel is added in the form of fuel droplets when releasing NOx from the NOx adsorption-reduction catalyst and which achieves an improved removal rate when the temperature of the NOx adsorption-reduction catalyst is low.

The first aspect of the invention relates to an exhaust gas purification apparatus for an internal combustion engine having: a fuel addition device that is provided in an exhaust gas passage of the internal combustion engine and adds fuel into the exhaust gas passage in the form of fine fuel droplets; and a NOx adsorption-reduction catalyst that is provided downstream of the fuel addition device in the exhaust gas passage and adsorbs NOx contained in the exhaust gas entering the NOx adsorption-reduction catalyst when the air-fuel ratio of the exhaust gas is lean and releases the adsorbed NOx when the air-fuel ratio of the exhaust gas is rich, wherein when the air-fuel ratio of the exhaust gas entering the NOx adsorption-reduction catalyst needs to be made rich in order to release the adsorbed NOx from the NOx adsorption-reduction catalyst, fuel is added from the fuel addition device such that the added fuel adheres to the NOx adsorption-reduction catalyst in the form of fuel droplets. According to this exhaust gas purification apparatus, the NOx adsorption-reduction catalyst is constituted of a plurality of NOx adsorption-reduction catalysts arranged in series, including an upstream NOx adsorption-reduction catalyst on which platinum Pt and, optionally, palladium Pd are supported and a downstream NOx adsorption-reduction catalyst which is arranged downstream of the upstream NOx adsorption-reduction catalyst and on which platinum Pt and palladium Pd are supported. Further, the ratio of the mole number of the platinum Pt supported on the downstream NOx adsorption-reduction catalyst to the sum of the mole numbers of the platinum Pt and the palladium Pd supported on the downstream NOx adsorption-reduction catalyst is approx. 50% to approx. 80%. Further, the ratio of the mole number of the platinum Pt supported on the upstream NOx adsorption-reduction catalyst to the sum of the mole numbers of the platinum Pt and the palladium Pd supported on the upstream NOx adsorption-reduction catalyst is higher than the ratio of the mole number of the platinum Pt supported on the downstream NOx adsorption-reduction catalyst to the sum of the mole numbers of the platinum Pt and the palladium Pd supported on the downstream NOx adsorption-reduction catalyst.

The effective release of NOx from the downstream NOx adsorption-reduction catalyst can be ensured if the ratio of the mole number of the platinum Pt supported on the downstream NOx adsorption-reduction catalyst to the sum of the mole numbers of the platinum Pt and the palladium Pd supported on the downstream NOx adsorption-reduction catalyst is set to approx. 50% to approx. 80%. More preferably, the ratio of the mole number of the platinum Pt supported on the downstream NOx adsorption-reduction catalyst is set to approx. 58% to approx. 75%. Further, if the ratio of the mole number of the platinum Pt supported on the downstream NOx adsorption-reduction catalyst is set to approx. 66%, a high NOx removal rate can be obtained. Further, if the ratio of the mole number of the platinum Pt is set for the plurality of NOx adsorption-reduction catalysts such that the more upstream the NOx adsorption-reduction catalyst is located, the higher the ratio of the mole number of the platinum Pt, a higher NOx removal rate can be obtained when the temperature of the NOx adsorption-reduction catalyst is low.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in more detail with reference to exemplary embodiments.

Figure 1:
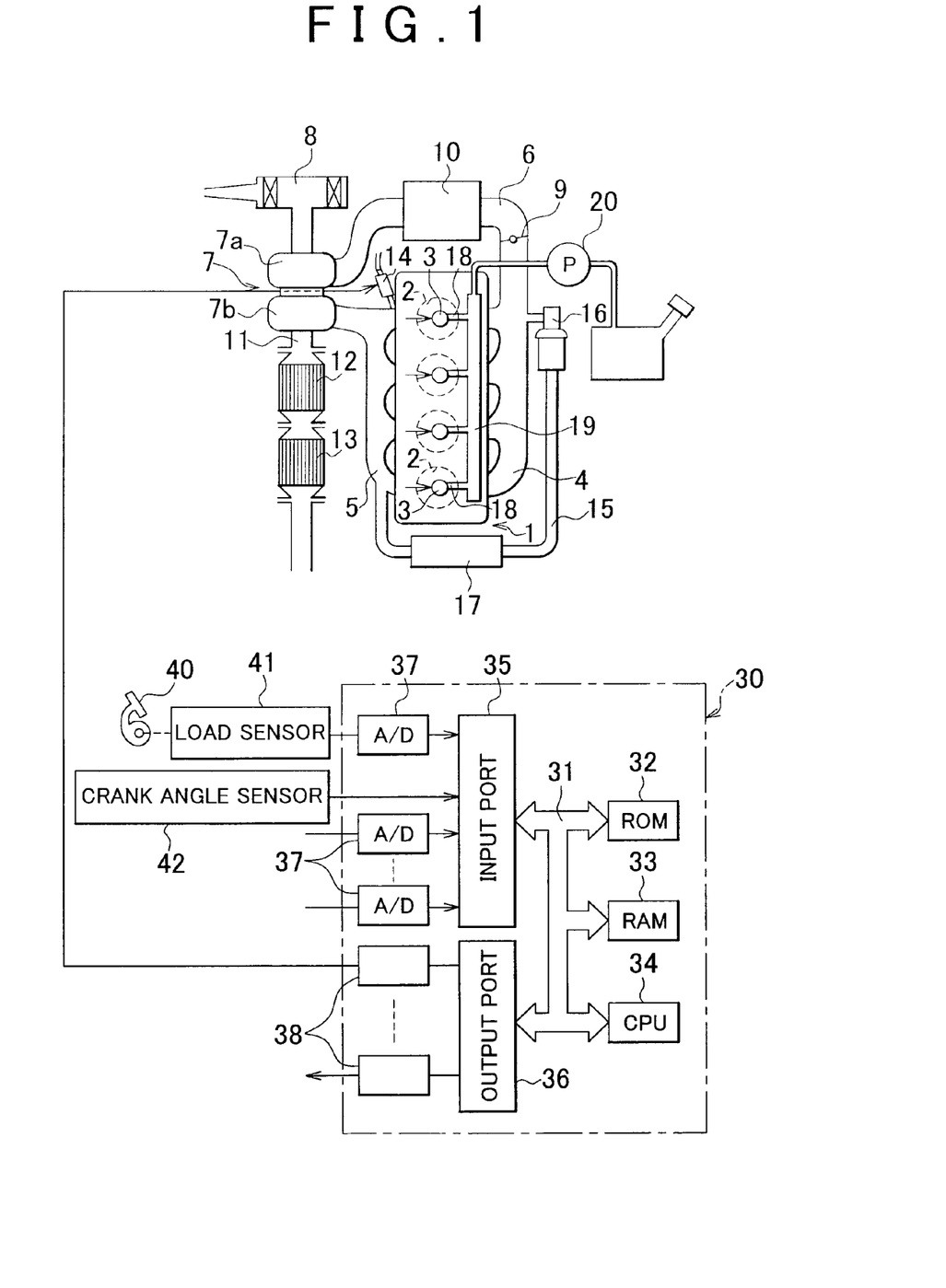
FIG. 1 is an overall view of a compression-ignition internal combustion engine.

FIG. 1 is an overall view of a compression-ignition internal combustion engine. Referring to FIG. 1, the internal combustion engine has an engine body 1, combustion chambers 2 of the respective cylinders, electronically controlled fuel injection valves 3 for injecting fuel into the respective combustion chambers 2, an intake manifold 4, and an exhaust manifold 5. The intake manifold 4 is connected to the outlet of a compressor 7a of a turbo charger 7 via an intake duct 6. The inlet of the compressor 7a is connected to an air cleaner 8. A throttle valve 9 driven by a step motor is provided in the intake duct 6. A cooling device 10 for cooling the intake air flowing in the intake duct 6 is provided around the intake duct 6. In the exemplary embodiment illustrated in FIG. 1, the engine coolant is distributed into the cooling device 10 and the intake air is cooled by the engine coolant.

On the other hand, the exhaust manifold 5 is connected to the inlet of a turbine 7b of the turbo charger 7. NOx adsorption-reduction catalysts 12, 13 are provided in series at an outlet 11 of the turbine 7b. Although the two NOx adsorption-reduction catalysts 12, 13 are provided in series in this exemplary embodiment, three or more NOx adsorption-reduction catalysts may be provided in series. A fuel addition valve 14 is provided in the exhaust manifold 5. The fuel addition valve 14 adds fuel into exhaust gas in the form of fine fuel droplets. In this exemplary embodiment, light oil is used as fuel.

The exhaust manifold 5 and the intake manifold 4 are connected to each other via an exhaust gas recirculation (EGR) passage 15. An EGR control valve 16 that is an electronically controlled valve is provided in the EGR passage 15. A cooling device 17 for cooling the EGR gas flowing in the EGR passage 15 is provided around the EGR passage 15. In the exemplary embodiment illustrated in FIG. 1, the engine coolant is distributed into the cooling device 17 and the EGR gas is cooled by the engine coolant. The fuel injection valves 3 are connected to a common rail 19 via corresponding fuel supply pipes 18. Fuel is supplied to the common rail 19 from an electronically controlled fuel pump 20 that can change its discharge rate. The fuel in the common rail 19 is then supplied to the fuel injection valves 3 via the fuel supply pipes 18, respectively.

An electronic control unit 30 is constituted by a digital computer having a ROM (Read Only Memory) 32, a RAM (Random Access Memory) 33, a CPU (microprocessor) 34, an input port 35, and an output port 36, which are all connected to each other via a bidirectional communication bus 31. A load sensor 41 is connected to an accelerator pedal 40. The load sensor 41 outputs voltage proportional to a depression L of the accelerator pedal 40. The voltage output from the load sensor 41 is input to the input port 35 via an AD converter 37. Further, a crank angle sensor 42 is connected to the input port 35. The crank angle sensor 42 outputs a pulse each time the crankshaft rotates, for example, 15 degrees. On the other hand, the output port 36 is connected to the fuel injection valves 3, the step motor for driving the throttle valve 9, the fuel addition valve 14, the EGR control valve 16, and the fuel pump 20 via corresponding drive circuits 38.

Figure 2:
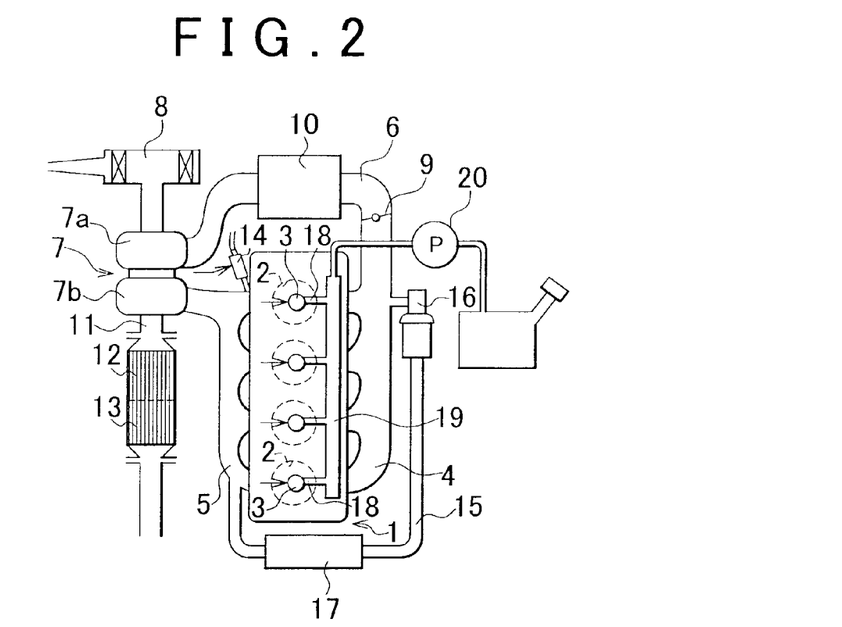
FIG. 2 is an overall view of a compression-ignition internal combustion engine according to another example.

FIG. 2 shows another example of a compression-ignition internal combustion engine. In this example, the NOx adsorption-reduction catalyst 12 provided on the upstream side and the NOx adsorption-reduction catalyst 13 provided on the downstream side are integrated.

Figure 3:
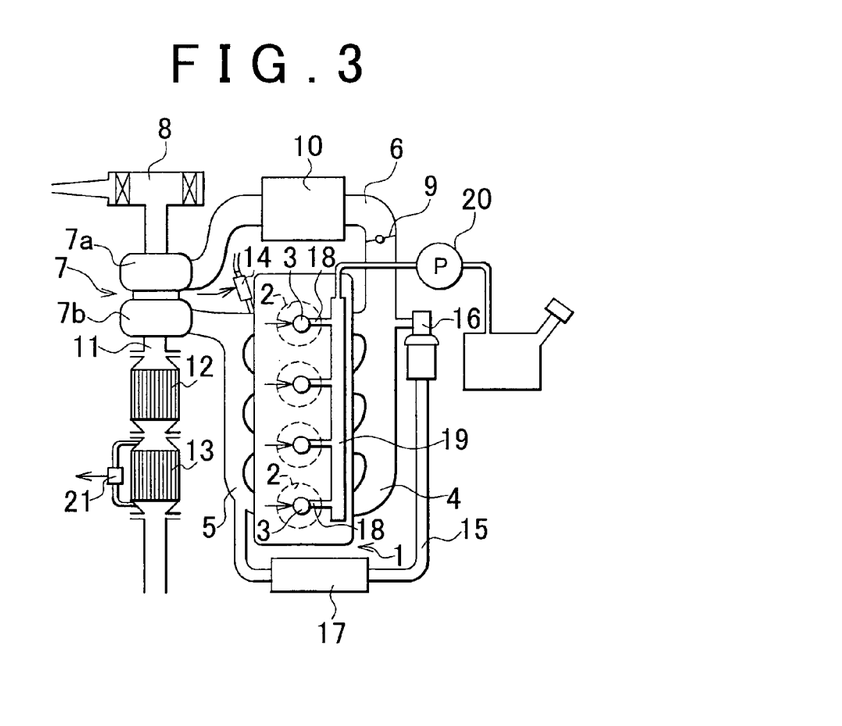
FIG. 3 is an overall view of a compression-ignition internal combustion engine according to still another example.
Figure 4A:
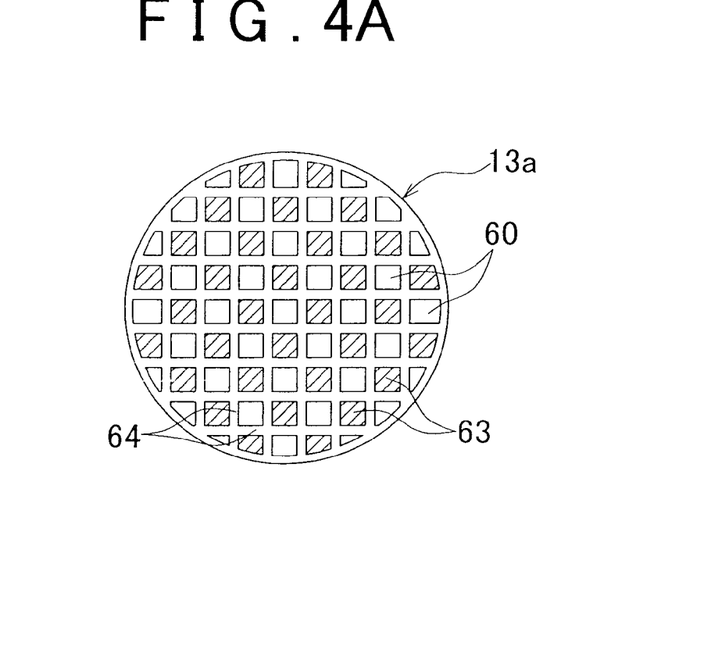
FIG. 4A is a front view of a particulate filter.
Figure 4B:
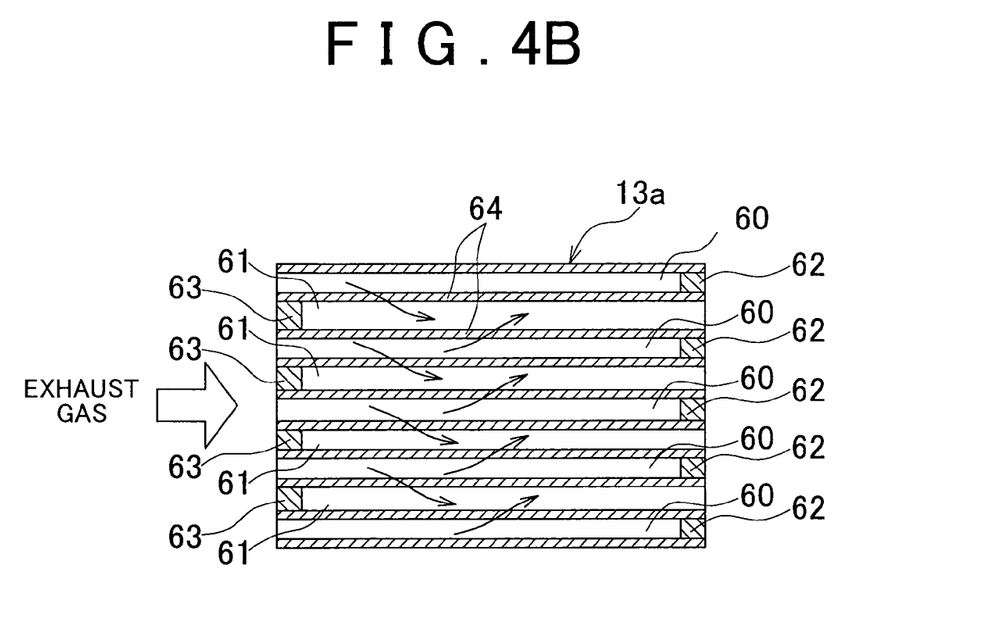
FIG. 4B is a cross-sectional side view of the particulate filter.

FIG. 3 shows another example of a compression-ignition internal combustion engine. In this example, the NOx adsorption-reduction catalyst 13 provided on the downstream side is supported on a particulate filter 13a(shown in FIGS. 4A and 4B). FIG. 4A and FIG. 4B show the structure of the particulate filter 13a on which the NOx adsorption-reduction catalyst 13 is supported. Note that FIG. 4A is a front view of the particulate filter 13a and FIG. 4B is a cross-sectional side view of the particulate filter 13a. Referring to FIG. 4A and FIG. 4B, the particulate filter 13a has a honeycomb structure having exhaust gas inlet passages 60 and exhaust gas outlet passages 61 running in parallel to each other. The downstream end of each exhaust gas inlet passage 60 is closed by a stopper 62 and the upstream end of each exhaust gas outlet passage 61 is closed by a stopper 63. Note that the hatched portions in FIG. 4 indicate the stoppers 63. That is, the exhaust gas inlet passages 60 and the exhaust gas outlet passages 61 are alternately arranged with thin partition walls 64 interposed therebetween. In other words, the exhaust gas inlet passages 60 and the exhaust gas outlet passages 61 are arranged such that each exhaust gas inlet passage 60 is surrounded by four exhaust outlet passages 61 and each exhaust gas outlet passage 61 is surrounded by four exhaust gas inlet passages 60.

The particulate filter 13a is made of a porous material, such as cordierite. Therefore, the exhaust gas enters each exhaust inlet gas passage 60 and then passes through the surrounding partition walls 64 to the adjacent exhaust gas outlet passages 61 as indicated by the arrows in FIG. 4B. A differential pressure sensor 21 for detecting the differential pressure across the particulate filter 13a, that is, the differential pressure across the downstream NOx adsorption-reduction catalyst 13, is provided at the downstream NOx adsorption-reduction catalyst 13. Hereinafter, the NOx adsorption-reduction catalyst 12 that is provided on the upstream side as shown in FIG. 1 to FIG. 3 will be referred to as "upstream NOx adsorption-reduction catalyst" and the NOx adsorption-reduction catalyst 13 that is provided on the downstream side as shown in FIG. 1 to FIG. 3 will be referred to as "downstream NOx adsorption-reduction catalyst".

Figure 5:
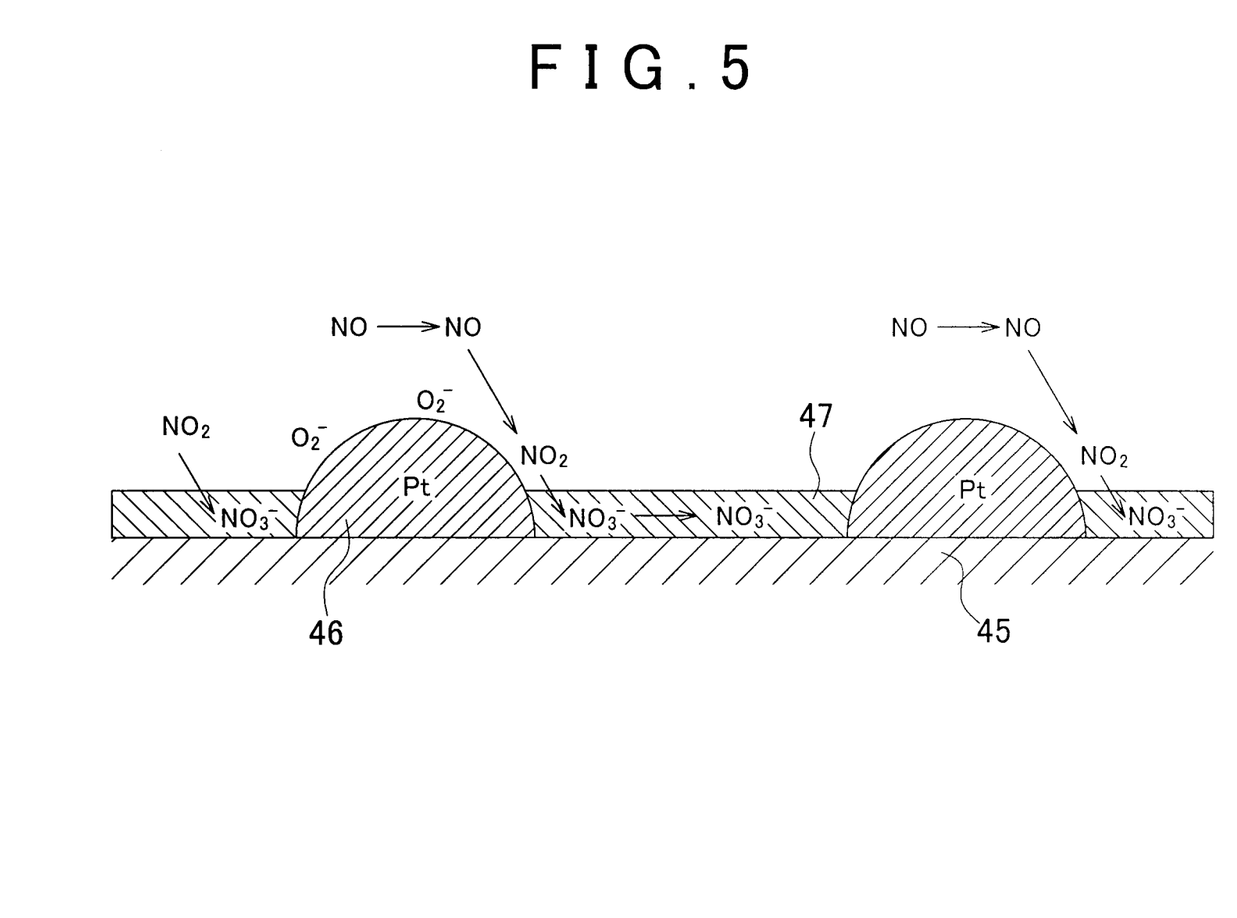
FIG. 5 is a cross-sectional view schematically showing the surface of the substrate of an upstream NOx adsorption-reduction catalyst.

FIG. 5 schematically shows a cross section of the surface of a catalyst carrier 45 that is made of, for example, alumina and is supported on the substrate of the upstream NOx adsorption-reduction catalyst 12. FIG. 6A, FIG. 6B, FIG. 7A, and FIG. 7B schematically show the cross section of the surface of a catalyst carrier 45 that is made of, for example, alumina and is supported on the substrate of the downstream NOx adsorption-reduction catalyst 13.

With regard to the structure of the upstream NOx adsorption-reduction catalyst 12, as shown in FIG. 5, platinum Pt 46 is dispersedly supported on the surface of the catalyst carrier 45, and a layer of NOx absorbent 47 is also formed on the surface of the catalyst carrier 45. On the other hand, with regard to the downstream NOx adsorption-reduction catalyst 13, as shown in FIG. 6A, FIG. 6B, FIG. 7A, and FIG. 7B, platinum Pt 46 and palladium Pd 48 are dispersedly supported on the catalyst carrier 45 and a layer of the NOx absorbent 47 is also formed on the catalyst carrier 45. The NOx absorbent 47 shown in FIG. 5, FIG. 6A, FIG. 6B, FIG. 7A, and FIG. 7B is made of at least one selected from the group consisting of alkali metal (e.g., potassium K, sodium Na, cesium Cs), alkali earth (e.g., barium Ba, calcium Ca), and alkali rare earth (e.g., lanthanum La, yttrium Y).

Assuming that the air-fuel ratio of exhaust gas is the ratio between the air and the fuel (hydrocarbon) supplied to the engine intake passage, the upstream NOx adsorption-reduction catalyst 12, and the exhaust gas passage upstream of the upstream NOx adsorption-reduction catalyst 12, the NOx absorbent 47 absorbs NOx when the air-fuel ratio of the exhaust gas is lean, and the NOx absorbent 47 releases the absorbed NOx when the oxygen concentration in the exhaust gas decreases.

Figure 6A:
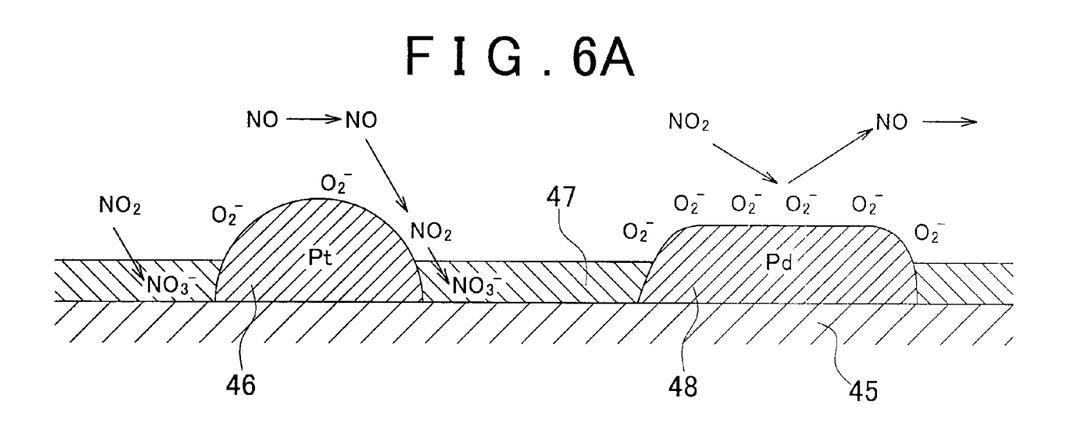
FIG. 6A and FIG. 6B are cross-sectional views schematically showing the surface of the substrate of a downstream NOx adsorption-reduction catalyst.
Figure 6B:
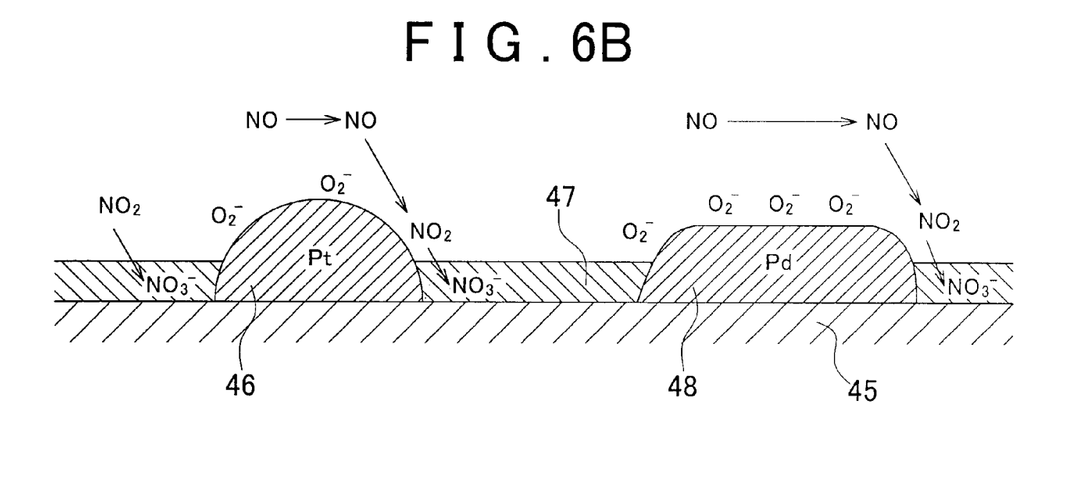

That is, for example, in the case where the NOx absorbent 47 is made of barium Ba, when the air-fuel ratio of the exhaust gas is lean, that is, when the oxygen concentration of the exhaust gas is high, the NO contained in the exhaust gas is oxidized into $NO_2$ on the platinum Pt 46 as shown in FIG. 6A and FIG. 6B, and then the $NO_2$ is absorbed in the NOx absorbent 47 and combined with barium oxide BaO and dispersed in the NOx absorbent 47 in the form of nitrate ions $NO_3^-$.

The palladium Pd 48 exhibits a low oxidizing capability and a high oxygen trapping capability when its temperature is below approx. 300° C. to 330° C. In this state, as shown in FIG. 6A, the $NO_2$ in the exhaust gas is deprived of oxygen on the surface of the palladium Pd 48 and thus become NO. This NO becomes $NO_2$ on the surface of the adjacent platinum Pt 46 and then absorbed in the NOx absorbent 47 in the form of nitrate ions $NO_3^-$. Meanwhile, the palladium Pd 48 exhibits a high oxidizing capability when its temperature is above approx. 300° C. to 330° C. In this state, as shown in FIG. 6B, the NO contained in the exhaust gas is oxidized into $NO_2$ on the surface of the palladium Pd 48 and absorbed in the NOx absorbent 47 in the form of nitrate ions $NO_3^-$.

Referring to FIG. 5, FIG. 6A, and FIG. 6B, part of the $NO_2$ contained in the exhaust gas is directly absorbed in the NOx absorbent 47 in the form of nitrate ions $NO_3^-$. This is how the NO and $NO_2$ contained in the exhaust gas, that is, the NOx contained in the exhaust gas is absorbed in the NOx absorbent 47. Thus, as long as the oxygen concentration of the exhaust gas is high, $NO_2$ are produced on the surface of the platinum Pt 46 or on the surface of palladium Pd 48, and as along as the NOx absorbing capacity of the NOx absorbent 47 is not saturated, $NO_2$ is absorbed in the NOx absorbent 47 and nitrate ions $NO_3^-$ are produced.

Meanwhile, when the air-fuel ratio of the exhaust gas is rich or equal to the stoichiometric air-fuel ratio, the oxygen concentration of the exhaust gas decreases, and this causes the reaction to progress in reverse ($NO_3^- \rightarrow NO_2$). Therefore, the nitrate ions $NO_3^-$ in the NOx absorbent 47 are released to the exhaust gas in the form of $NO_2$. The released NOx is then reduced by unburned HC and CO contained in the exhaust gas.

As such, when the air-fuel ratio of the exhaust gas is lean, that is, when the engine combustion is performed at a lean air-fuel ratio, the NOx in the exhaust gas is absorbed in the NOx absorbent 47. However, if the engine combustion is continued at a lean air-fuel ratio, the NOx absorbing capacity of the NOx absorbent 47 is saturated in time and therefore the NOx absorbent 47 becomes unable to absorb any more NOx. To cope with this, in this exemplary embodiment of the invention, fuel is added from the fuel addition valve 14 before the absorbing capacity of the NOx absorbent 47 is saturated. By doing so, the air-fuel ratio of the exhaust gas is made rich temporarily, so that the NOx absorbed in the NOx absorbent 47 is released therefrom.

Although platinum Pt has a property of trapping oxygen on its surface, the amount of oxygen that platinum Pt can trap is not large. As compared to platinum, palladium Pd can trap a far larger amount of oxygen. Therefore, when the air-fuel ratio of the exhaust gas is lean, as shown in FIG. 6A, the palladium Pd 48 traps and stores a far larger amount of oxygen than the platinum Pt 46 does. On the other hand, in view of the oxidizing capability, platinum Pt has an extremely high oxidizing capability while palladium Pd has a low oxidizing capability. As such, platinum Pt and palladium Pd are significantly different in property.

When the air-fuel ratio of the exhaust gas has been made rich by adding fuel from the fuel addition valve 14 as described above, NOx is released from the NOx absorbent 47 and the released NOx is then reduced by the unburned HC and CO contained in the exhaust gas. In this case, if the added fuel is in a liquid state, the oxygen concentration of the exhaust gas does not decrease although the air-fuel ratio of the exhaust gas becomes "rich" theoretically. In this case, therefore, NOx is not released from the NOx absorbent 47. According to the invention, however, even if the added fuel is in a liquid state, NOx can be released from the NOx absorbent 47 effectively.

Figure 7A:
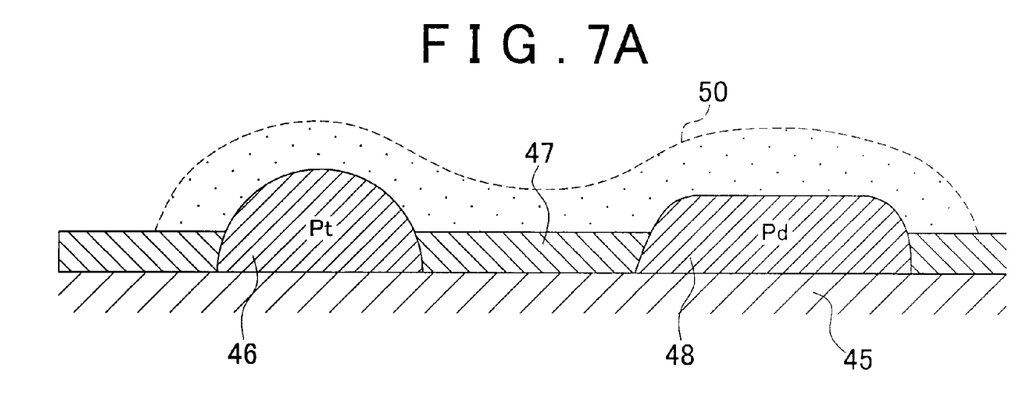
FIG. 7A and FIG. 7B are cross-sectional views schematically showing the surface of the substrate of the downstream NOx adsorption-reduction catalyst.

That is, although part of the fuel added from the fuel addition valve 14 turns into a fuel gas, most of the fuel flows through the exhaust gas passage in the form of fuel droplets together with the exhaust gas and the fuel droplets then adhere to the NOx adsorption-reduction catalysts 12, 13. As a result, in the downstream NOx adsorption-reduction catalyst 13, the platinum Pt and the palladium Pd are covered by the fuel droplets 50 as shown in FIG. 7A. When the platinum Pt is covered by the fuel droplets 50, the oxygen contained in the exhaust gas cannot reach the surface of the platinum Pt because it is blocked by the fuel droplets 50 on the platinum Pt. Therefore, when only platinum Pt is evaluated, no matter how high the oxidizing capability of the platinum Pt is, the oxidizing reaction of the fuel droplets 50 does not progress so much, and therefore the fuel droplets 50 are not vaporized so much.

On the other hand, since a large amount of oxygen is stored in the palladium Pd, when the palladium Pd is covered by the fuel droplets 50, the fuel droplets 50 are oxidized by the large amount of oxygen on the palladium Pd. At this time, a large amount of oxidization reaction heat is generated, and this oxidization reaction heat vaporizes the fuel droplets 50 covering the palladium Pd and also vaporizes the fuel droplets 50 covering the platinum Pt. When the fuel droplets 50 covering the platinum Pt have been vaporized, the oxygen in the exhaust gas starts to reach the surface of the platinum Pt, and this promotes the oxidization reactions of the unburned HC and CO on the platinum Pt. As a result, the oxygen concentration of the exhaust gas decreases, so that NOx is released from the NOx absorbent 47 and the released NOx is then reduced by the vaporized unburned HC and CO.

As such, if palladium Pd is supported on the downstream NOx adsorption-reduction catalyst 13 as well as platinum Pt, the releasing and reducing of NOx can be properly carried out. However, if the amount of palladium Pd is increased and the amount of platinum Pt is reduced while maintaining the sum of the amount of platinum Pt and the amount of palladium Pd at a constant value, the reduction of platinum Pt makes it difficult for the unburned HC and CO to be sufficiently oxidized and therefore NOx cannot be released effectively, although the vaporization of the fuel droplets 50 is promoted by the increased oxidization reaction heat caused by the oxygen stored in the palladium Pd.

On the other hand, if the amount of the palladium Pd is reduced and the amount of the platinum Pt is increased correspondingly, the vaporization of the fuel droplets 50 on the platinum Pt is not sufficiently promoted by the oxidization reaction heat of the oxygen stored in the palladium Pd, and therefore, despite the increased amount of platinum Pt, the unburned HC and CO cannot be oxidized sufficiently. That is, in this case, too, NOx cannot be released sufficiently. As such, it is clear that the effective release of NOx can be accomplished only when the ratio between the amount of platinum Pt and the amount of palladium Pd is in a given proper range that is not excessively high nor excessively low.

Figure 8:
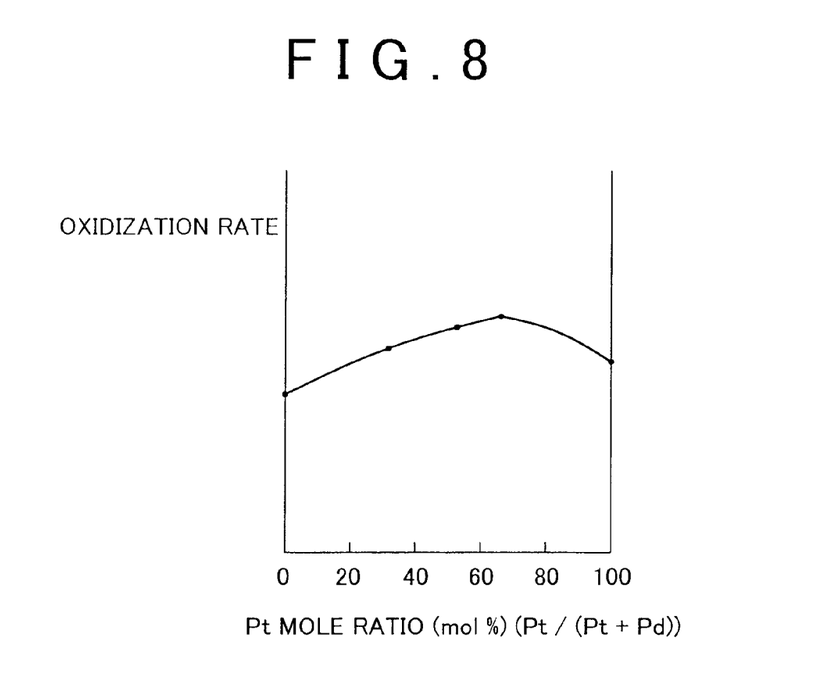
FIG. 8 is a graph illustrating the relation between the oxidization rate and the platinum mole ratio.

FIG. 8 shows an empirically obtained relation between the oxidization rate, which represents the oxidization amount per unit time, and the ratio of the mole number of the platinum Pt to the sum of the mole numbers of the platinum Pt and the palladium Pd (will hereinafter be referred to as "platinum mole ratio"). Referring to FIG. 8, the higher the oxidization rate, the effect of releasing NOx from the NOx absorbent 47 is enhanced. As shown in FIG. 8, the NOx releasing effect peaks when the platinum mole ratio is approx. 66%.

Figure 9:
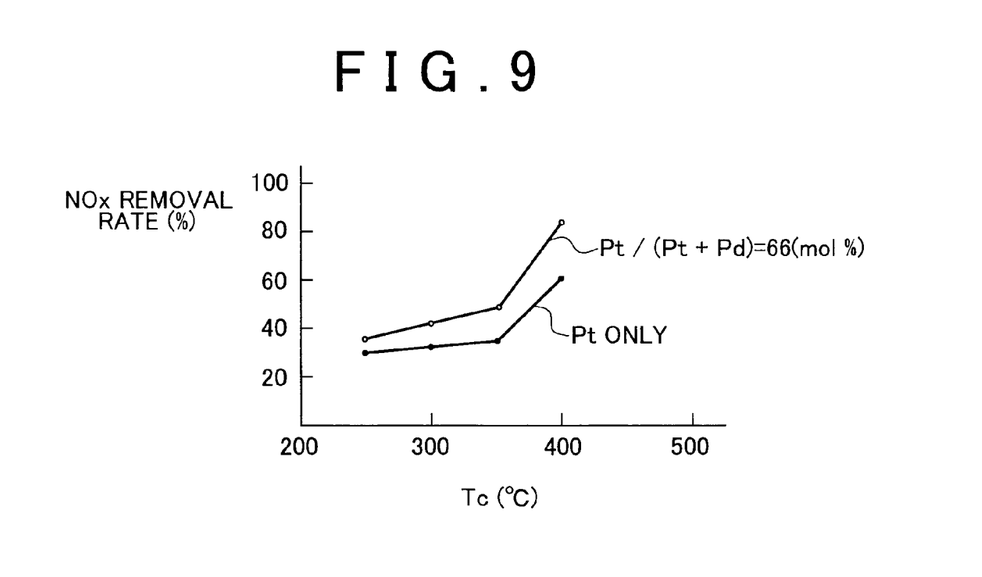
FIG. 9 is a graph illustrating the relation between the NOx removal rate and the temperature of the NOx adsorption-reduction catalyst.

FIG. 9 illustrates the relation between the NOx removal rate and a temperature Tc of the downstream NOx adsorption-reduction catalyst 13, which was empirically obtained after the releasing of NOx. In FIG. 9, the black dots represent the case where only platinum Pt is supported on the downstream NOx adsorption-reduction catalyst 13, that is, where the platinum mole ratio is 100%. On the other hand, the empty dots represent the case where the platinum mole ratio is 66%. As is evident from FIG. 9, the NOx removal rate increases as the temperature Tc of the downstream NOx adsorption-reduction catalyst 13 increases in both the case of the 100% platinum mole ratio and the case of the 66% platinum mole ratio. However, the NOx removal rate is higher, at any level of the temperature Tc, when the platinum mole ratio is 66% than when it is 100%.

Figure 10:
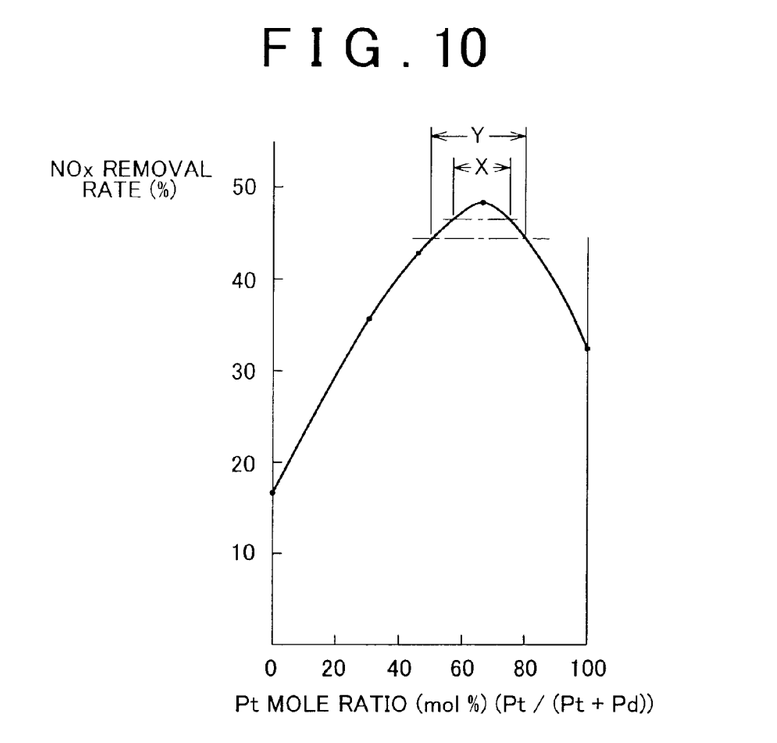
FIG. 10 is a graph illustrating the relation between the NOx removal rate and the platinum mole ratio.

FIG. 10 illustrates the relation between the NOx removal rate and the platinum mole ratio that is obtained when the temperature Tc of the downstream NOx adsorption-reduction catalyst 13 is 350° C. There is a common tendency between the variation of the NOx removal rate indicated in FIG. 10 and the variation of the oxidization rate indicated in FIG. 8. As shown in FIG. 10, the NOx removal rate peaks when the platinum mole ratio is approx. 66%. Therefore, most preferably, the amounts of platinum Pt and palladium Pd to be supported on the downstream NOx adsorption-reduction catalyst 13 are set such that the ratio therebetween becomes approx. 66%.

When the NOx removal rate has decreased, if the rate of the decrease is within 5% or so, it still can be said to be the maximum NOx removal rate. The range of the platinum mole ratio corresponding to this tolerance of the maximum NOx removal rate is from approx. 58% to approx. 75% as indicated by "X" in FIG. 10. As such, the platinum mole ratio is preferably set within the range from approx. 58% to approx. 75%.

Further, even if the NOx removal rate is made lower than the maximum NOx removal rate by 10% or so, it is still effective in practical use, and the range of the platinum mole ratio corresponding to the range of the −10% NOx removal rate is from approx. 50% to approx. 80% as indicated by "Y" in FIG. 10. As such, in view of practical use, it is sufficient to set the platinum mole ratio in the range of approx. 50% to approx. 80%.

Figure 11:
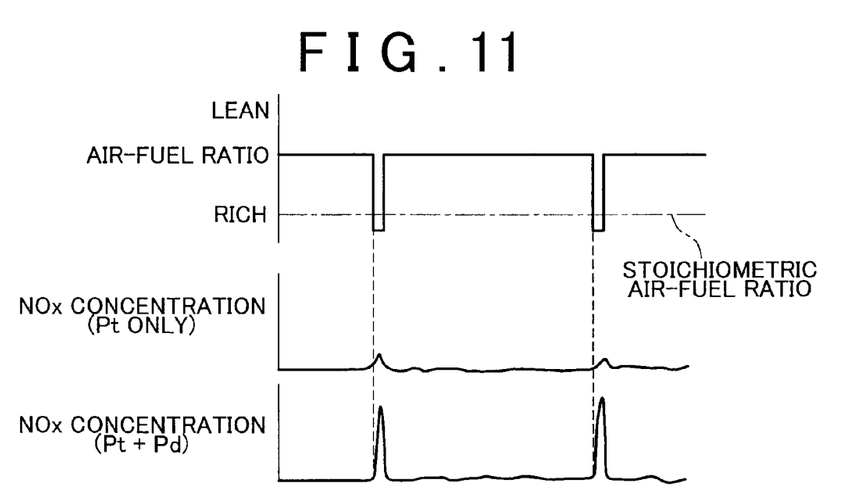
FIG. 11 is a chart comparing the NOx concentration of a NOx adsorption-reduction catalyst on which only platinum Pt is supported and the NOx concentration of a NOx adsorption-reduction catalyst on which platinum Pt and palladium Pd are supported.

FIG. 11 illustrates how the NOx concentration of the exhaust gas discharged from a NOx adsorption-reduction catalyst varies when the air-fuel ratio in the combustion chambers of a gasoline engine is made rich, that is, when the air-fuel ratio of the exhaust gas, which is in a gaseous state, is made rich. More specifically, FIG. 11 shows the NOx concentration variation found with a NOx adsorption-reduction catalyst on which only platinum Pt is supported and the NOx concentration variation found with a NOx adsorption-reduction catalyst on which platinum Pt and palladium Pd are supported. As is evident from FIG. 11, when the NOx adsorption-reduction catalyst carrying only platinum Pt is used, the NOx concentration is low when the air-fuel ratio of the exhaust gas is made rich. On the other hand, when the NOx adsorption-reduction catalyst carrying platinum Pt and palladium Pd is used, the NOx concentration is high when the air-fuel ratio of the exhaust gas is made rich.

That is, because the oxygen concentration of the exhaust gas decreases when the air-fuel ratio of the exhaust gas is made rich, it causes NOx to be released from the NOx absorbent 47. However, if palladium Pd is supported on the NOx adsorption-reduction catalyst, the unburned HC and CO are oxidized by a large amount of oxygen stored in the palladium Pd and therefore the released NOx is not reduced by the unburned HC and CO. As such, the NOx concentration increases when platinum Pt and palladium Pd are supported on the NOx adsorption-reduction catalyst.

That is, in the case where palladium Pd is supported on the NOx absorption-reduction catalyst, when the air-fuel ratio of the exhaust gas is made rich to release NOx from the NOx absorbent 47, a large amount of NOx is discharged to the ambient air and therefore the NOx removal rate decreases accordingly. However, even when a NOx absorption-reduction catalyst carrying palladium Pd is used, if fuel is added into exhaust gas in the form of fuel droplets when releasing NOx from the NOx absorbent, 47, a high NOx removal rate can be achieved. Thus, in view of the NOx removal rate, it is considered that palladium Pd effectively works when fuel is added in the form of fuel droplets.

As have already been described with reference to FIG. 6A and FIG. 7A, when the air-fuel ratio of the exhaust gas is lean, NO and $NO_2$ contained in exhaust gas, that is, NOx contained in exhaust gas is absorbed in the NOx absorbent 47 of the downstream NOx adsorption-reduction catalyst 13. However, the NOx absorbent 47 can absorb NO and $NO_2$ only when the platinum Pt 46 is in an activated state. That is, if the platinum Pt 46 has not yet been activated, the NOx absorbent 47 cannot absorb NO and the $NO_2$ sufficiently.

The platinum Pt 46 is activated when its temperature is approx. 200° C. or higher. Therefore, after engine start, the platinum Pt 46 remains in an inactivated state until its temperature exceeds approx. 200° C. Note that FIG. 7B shows a case where the platinum Pt 46 is in an inactivated state.

Figure 7B:
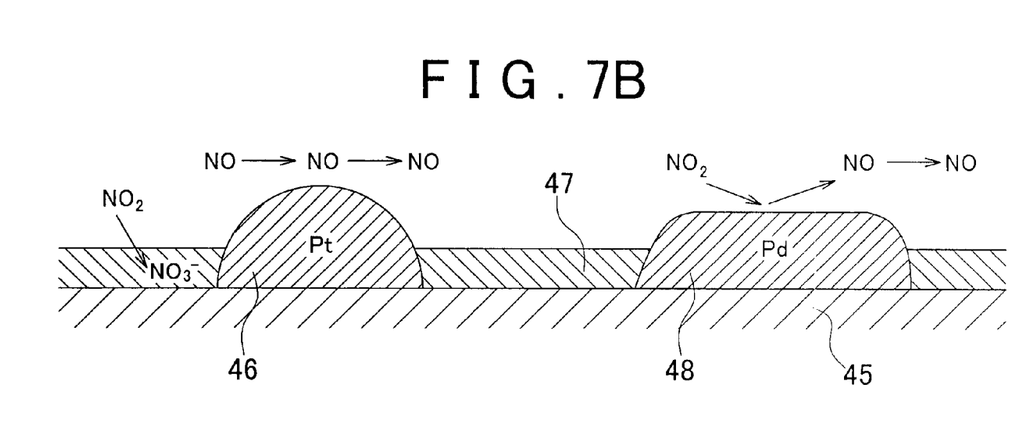

Referring to FIG. 7B, because the platinum Pt 46 is in an inactivated state, NO contained in exhaust gas is not oxidized into $NO_2$ on the surface of the platinum Pt 46. Therefore, NO just passes without being absorbed in the NOx absorbent 47. On the other hand, as mentioned above, the oxidizing capability of the palladium Pd 48 is lower than that of the platinum Pt 46. Therefore, in a state where the platinum Pt 46 cannot exert its oxidizing effect adequately, the palladium Pd 48 cannot exert its oxidizing effect at all. Therefore, when the platinum Pt 46 is in an inactivated state, NO is not oxidized into $NO_2$ on the surface of the palladium Pd 48, and thus NO just passes without being absorbed in the NOx absorbent 47.

On the other hand, as mentioned above, the oxygen trapping capability of the palladium Pd 48 is higher than that of the platinum Pt 46, and therefore the oxygen trapping capability of the palladium Pd 48 is high even when the platinum Pt 46 is in an inactivated state. Thus, as shown in FIG. 7B, $NO_2$ contained in the exhaust gas is deprived of oxygen on the surface of the palladium Pd 48 and thus converted to NO. This NO is discharged to the outside without being absorbed by the NOx absorbent 47.

Figure 12:
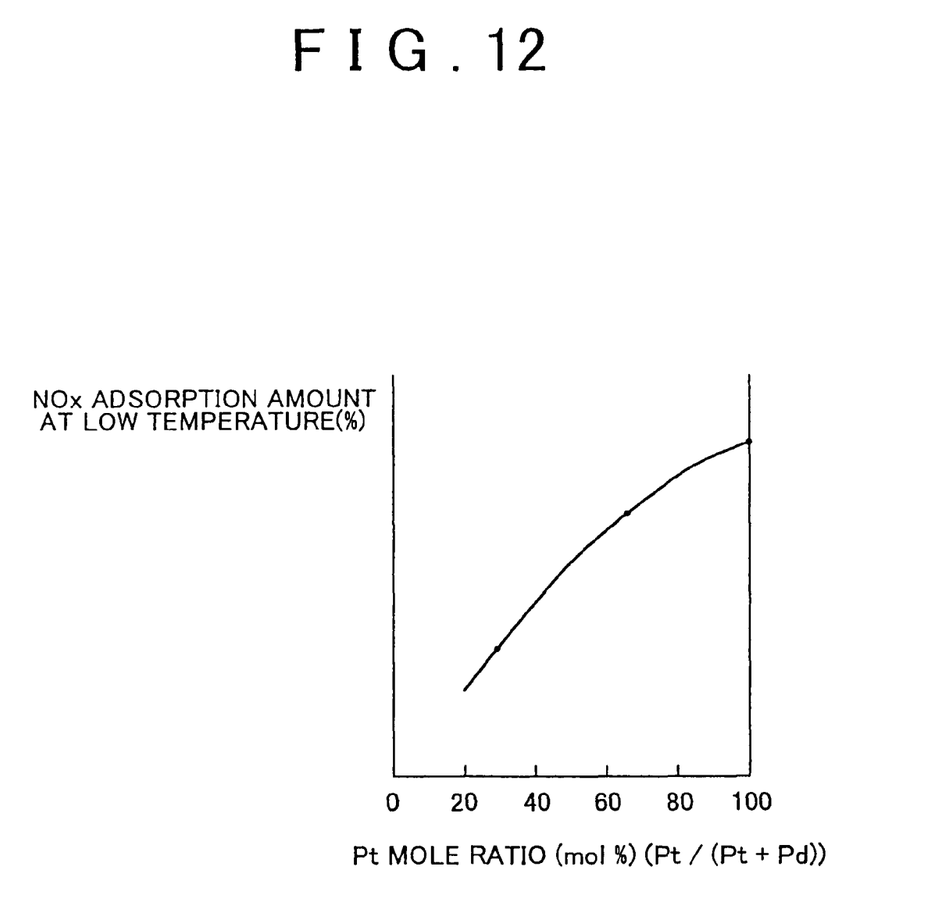
FIG. 12 is a graph illustrating the relation between the NOx adsorption amount and the platinum mole ratio at a low temperature.

That is, as mentioned above, $NO_2$ contained in exhaust gas is directly absorbed in the NOx absorbent 47. However, in the presence of the palladium Pd 48, as shown in FIG. 7B, $NO_2$ contained in exhaust gas is converted to NO, and therefore the amount of NOx to be absorbed in the NOx absorbent 47 decreases. FIG. 12 illustrates the result of a study on how the amount of adsorbed NOx changes when the platinum Pt 46 is in the inactivated state, that is, when the platinum Pt 46 is at a low temperature. Referring to FIG. 12, the lower the platinum mole ratio, that is, the higher the ratio of the mole number of the palladium Pd 48, the less the amount of NOx adsorbed in the NOx absorbent 47.

In view of this, in the invention, the platinum mole ratio for the upstream NOx adsorption-reduction catalyst 12 is made higher than that for the downstream NOx adsorption-reduction catalyst 13. Specifically, in the exemplary embodiments illustrated in FIG. 1 to FIG. 3, the platinum mole ratio for the upstream NOx adsorption-reduction catalyst 12, which is provided on the upstream side as shown in FIG. 5, is 100%.

Thus, $NO_2$ contained in exhaust gas is effectively adsorbed in the upstream NOx adsorption-reduction catalyst 12 until the platinum Pt 46 is activated, that is, until the warming-up of the downstream NOx adsorption-reduction catalyst 13 is completed, after an engine start. As such, the NOx removal rate during the time period from the engine start to the completion of the activation of the platinum Pt 46 improves. Once the platinum Pt 46 has been activated, the upstream NOx adsorption-reduction catalyst 12 and the downstream NOx adsorption-reduction catalyst 13 will soon start adsorbing NOx effectively.

After fuel is added from the fuel addition valve 14, the fuel adheres to the upstream NOx adsorption-reduction catalyst 12 and the downstream NOx adsorption-reduction catalyst 13. However, the adhering fuel in the upstream NOx adsorption-reduction catalyst 12 does not vaporize as effectively as the adhering fuel in the downstream NOx adsorption-reduction catalyst 13 does. Therefore, the NOx releasing effect of the upstream NOx adsorption-reduction catalyst 12 is insufficient as compared to that of the downstream NOx adsorption-reduction catalyst 13. However, because the upstream NOx adsorption-reduction catalyst 12 is mainly used to adsorb NOx during the period from the engine start to the completion of the warming-up of the downstream NOx adsorption-reduction catalyst 13, as long as the upstream NOx adsorption-reduction catalyst 12 can effectively adsorb NOx during this period, even if the NOx releasing effect of the upstream NOx adsorption-reduction catalyst 12 is insufficient as compared to that of the downstream NOx adsorption-reduction catalyst 13 as mentioned above, it does not cause any significant problem.

Figure 13:
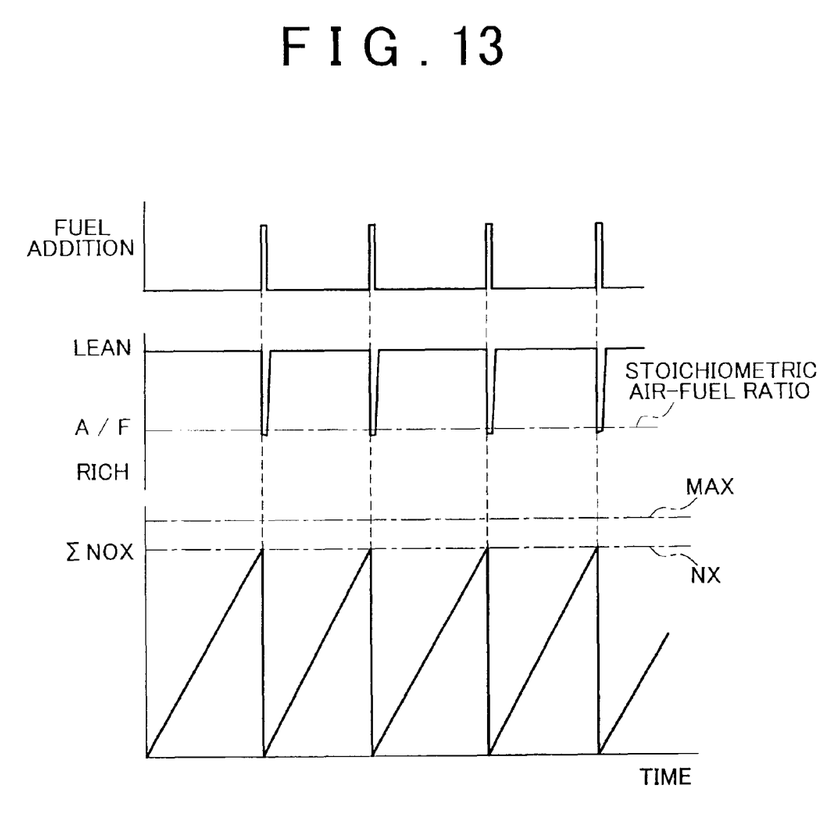
FIG. 13 is a timechart illustrating a procedure for releasing NOx.
Figure 14:
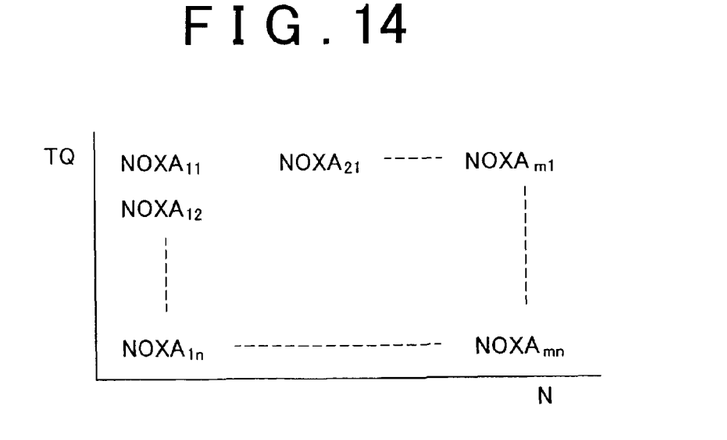
FIG. 14 is a map indicating the amount of NOx adsorbed per unit time.

Next, the NOx releasing control will be described with reference to FIG. 13. FIG. 13 shows the variation of the amount of NOx adsorbed in the NOx adsorption-reduction catalysts 12, 13, which is denoted "ΣNOX", and the timing to make the air-fuel ratio of the exhaust gas rich by adding fuel, which is denoted "A/F". The amount of NOx discharged from the engine per unit time changes depending upon the operation state of the engine, and therefore the amount of NOx that is newly adsorbed to the NOx adsorption-reduction catalysts 12, 13 per unit time also changes depending upon the operation state of the engine. In this exemplary embodiment, a NOx amount NOXA representing the amount of NOx that is newly adsorbed to the NOx adsorption-reduction catalysts 12, 13 per unit time is defined as a function of a required torque TQ and an engine speed N and stored in the ROM 32 in the form of a map shown in FIG. 14. The NOx amount ΣNOX representing the amount of NOx that is presently adsorbed in the NOx adsorption-reduction catalyst 12, 13 can be calculated by accumulating the values of the NOx amount NOXA.

"MAX" in FIG. 13 represents the maximum amount of NOx that can be adsorbed in the NOx adsorption-reduction catalysts 12, 13, and "NX" represents the allowable value of the amount of NOx that can be adsorbed in the NOx adsorption-reduction catalysts 12, 13. Therefore, as shown in FIG. 13, when the NOx amount ΣNOX reaches the allowable value NX, the air-fuel ratio A/F of the exhaust gas entering the NOx adsorption-reduction catalysts 12, 13 is made rich temporarily, so that NOx is released from the NOx adsorption-reduction catalysts 12, 13.

On the other hand, in the example illustrated in FIG. 3, the particulate matter contained in exhaust gas is trapped by the particulate filter 13a on which the downstream NOx adsorption-reduction catalyst 13 is supported and then oxidized gradually. However, if the rate at which particulate matter is trapped by the particulate filter 13a is higher than the rate at which particulate matter is oxidized at the particulate filter 13a, particulate matter gradually accumulates on the particulate filter 13a. Such an increase in the amount of particulate matter accumulating on the particulate filter 13a causes a decrease in the output of the engine. To prevent this, when the accumulating particulate matter has increased, the accumulating particulate matter needs to be removed. At this time, for example, the particulate filter 13a is heated to approx. 600° C. while increasing the amount of air to an excessive level, so that the accumulating particulate matter is oxidized and thus removed.

More specifically, in the example illustrated in FIG. 3, when the amount of the particulate matter accumulating on the particulate filter 13a exceeds the allowable amount, the temperature of the particulate filter 13a is increased while the air-fuel ratio of the exhaust gas is kept lean, so that the accumulating particulate matter is oxidized and thus removed. That is, when a differential pressure ΔP across the particulate filter 13a that is detected by the differential pressure sensor 21 exceeds an allowable value PX, the amount of the accumulating particulate matter is determined to have exceeded the allowable amount. At this time, a heating control is executed in which fuel is added from the fuel injection valve 14 while keeping the exhaust gas entering the particulate filter 13a lean, so that the reaction heat generated through the oxidization of the added fuel increases the temperature of the particulate filter 13a.

Figure 15:
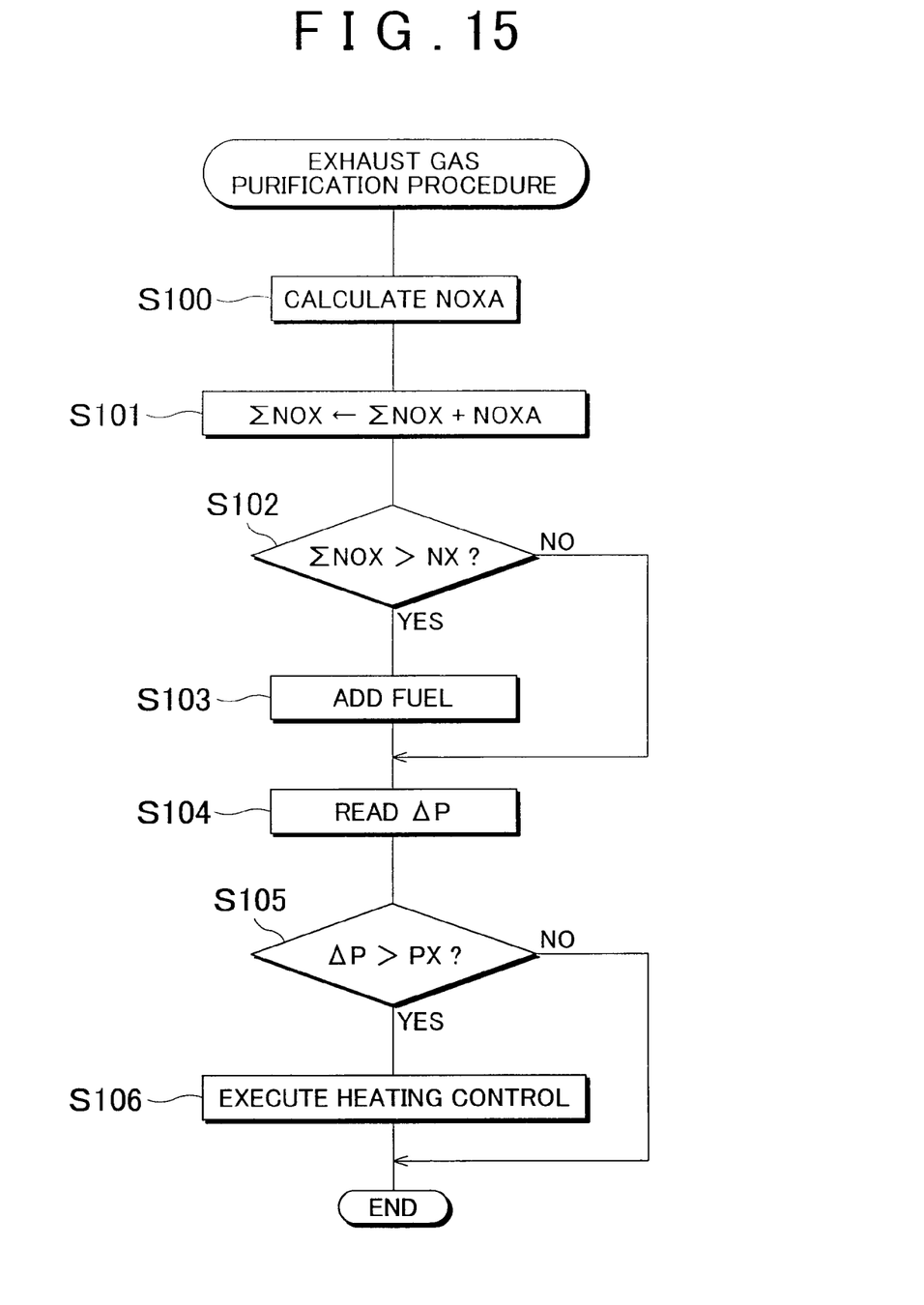
FIG. 15 is a flowchart showing an exhaust gas purification procedure.

FIG. 15 shows an exhaust gas purification routine suitable for the example illustrated in FIG. 3. First, in step 100, the NOx amount NOXA, which represents the amount of NOx that is newly adsorbed to the NOx adsorption-reduction catalyst 12, 13 per unit time, is first calculated from the map shown in FIG. 14. Then, in step 101, the calculated NOx amount NOXA is added to the NOx amount ΣNOX representing the amount of NOx that is presently adsorbed in the NOx adsorption-reduction catalyst 12, 13. Then, in step 102, it is determined whether the NOx amount ΣNOX has exceeded the allowable value NX. If ΣNOX>NX is true, the control proceeds to step 103 where a process for adding fuel from the fuel addition valve 14 is executed. Then, in step 104, the differential pressure ΔP across the particulate filter 13a is detected. Then, in step 105, it is determined whether the differential pressure ΔP has exceeded the allowable value PX. If ΔP>PX is true, the control proceeds to step 106 where the above-described heating control is performed to the particulate filter 13a.

What is claimed is:

1. An exhaust gas purification apparatus for an internal combustion engine, comprising:

a fuel addition device that is provided in an exhaust gas passage of the internal combustion engine and adds fuel into the exhaust gas passage in the form of fine fuel droplets; and a NOx adsorption-reduction catalyst that is provided downstream of the fuel addition device in the exhaust gas passage and adsorbs NOx contained in the exhaust gas entering the NOx adsorption-reduction catalyst when the air-fuel ratio of the exhaust gas is lean and releases the adsorbed NOx when the air-fuel ratio of the exhaust gas is rich, wherein when the air-fuel ratio of the exhaust gas entering the NOx adsorption-reduction catalyst needs to be made rich in order to release the adsorbed NOx from the NOx adsorption-reduction catalyst, fuel is added from the fuel addition device such that the added fuel adheres to the NOx adsorption-reduction catalyst in the form of fuel droplets, the NOx adsorption-reduction catalyst is constituted of a plurality of NOx adsorption-reduction catalysts arranged in series, including (i) an upstream NOx adsorption-reduction catalyst on which platinum Pt and, optionally, palladium Pd are supported and (ii) a downstream NOx adsorption-reduction catalyst which is arranged downstream of the upstream NOx adsorption-reduction catalyst and on which platinum Pt and palladium Pd are supported;

a first ratio of the mole number of the platinum Pt supported on the downstream NOx adsorption-reduction catalyst to the sum of the mole numbers of the platinum Pt and the palladium Pd supported on the downstream NOx adsorption-reduction catalyst is approximately 50% to approximately 80%; and a second ratio of the mole number of the platinum Pt supported on the upstream NOx adsorption-reduction catalyst to the sum of the mole numbers of the platinum Pt and the palladium Pd supported on the upstream NOx adsorption-reduction catalyst is higher than the first ratio of the mole number of the platinum Pt supported on the downstream NOx adsorption-reduction catalyst to the sum of the mole numbers of the platinum Pt and the palladium Pd supported on the downstream NOx adsorption-reduction catalyst.

2. The exhaust gas purification apparatus according to claim 1, wherein
the first ratio is approximately 58% to approximately 75%.

3. The exhaust gas purification apparatus according to claim 2, wherein
the first ratio is approximately 66%.

4. The exhaust gas purification apparatus according to claim 1, wherein
the second ratio is 100%.

5. The exhaust gas purification apparatus according to claim 1, wherein
the downstream NOx adsorption-reduction catalyst is supported on a particulate filter.

* * * * *